US012749963B2

(12) United States Patent
Akram et al.

(10) Patent No.: US 12,749,963 B2
(45) Date of Patent: Sep. 29, 2026

(54) LOW-POWER MODE FOR MULTI-LEVEL CONVERTER

(71) Applicant: Cirrus Logic International Semiconductor Ltd., Edinburgh (GB)

(72) Inventors: Hasnain Akram, Austin, TX (US); Graeme G. Mackay, Austin, TX (US); Eric J. King, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 185 days.

(21) Appl. No.: 18/415,862

(22) Filed: Jan. 18, 2024

(65) Prior Publication Data

US 2024/0250599 A1 Jul. 25, 2024

Related U.S. Application Data

(60) Provisional application No. 63/440,287, filed on Jan. 20, 2023.

(51) Int. Cl.
*H02M 1/00* (2007.01)
*H02M 3/158* (2006.01)

(52) U.S. Cl.
CPC ....... *H02M 1/0032* (2021.05); *H02M 1/0025* (2021.05); *H02M 1/0095* (2021.05); *H02M 3/1582* (2013.01)

(58) Field of Classification Search
CPC ............. H02M 1/0025; H02M 1/0035; H02M 1/0045; H02M 1/0095; H02M 3/07;
(Continued)

(56) References Cited

U.S. PATENT DOCUMENTS 9,653,986 B2 * 5/2017 Zhak ..................... H02M 3/073 323/311
10,103,620 B1 * 10/2018 Wei ....................... H02M 3/156
(Continued)

OTHER PUBLICATIONS

International Search Report and Written Opinion of the International Searching Authority, International Application No. PCT/US2024/012096.
(Continued)

*Primary Examiner* — Crystal L Hammond
*Assistant Examiner* — Nicolas Alden Chapa Mills
(74) *Attorney, Agent, or Firm* — Jackson Walker L.L.P.

(57) ABSTRACT

A system may include a control circuit and a multi-level power converter comprising a plurality of switches and a power inductor electrically coupled to the plurality of switches, wherein the power inductor is coupled to a switching node of the multi-level power converter, wherein the multi-level power converter is capable of applying three or more switching voltages to the switching node. The control circuit may generate control signals that define a sequence of switching of the plurality of switches of the power converter, the control circuit configured to, during a switching cycle of the converter in which the power inductor is magnetized and demagnetized, control switching of the plurality of switches among at least three switch configurations during magnetization and demagnetization of the power inductor such that a voltage on the switching node experiences a different respective magnitude of voltage in each of the at least three switch configurations.

12 Claims, 5 Drawing Sheets

(58) Field of Classification Search
CPC .... H02M 3/072; H02M 3/158; H02M 7/4833; H02M 7/4837; Y02B 70/10
See application file for complete search history.

(56) References Cited

U.S. PATENT DOCUMENTS

| | | | | |
|---|---|---|---|---|
| 10,461,640 | B2 | 10/2019 | King et al. | |
| 10,848,061 | B2 | 11/2020 | King et al. | |
| 2018/0367033 | A1* | 12/2018 | Kotikalapoodi | H02M 1/14 |
| 2019/0149044 | A1 | 5/2019 | Itoh et al. | |
| 2022/0345042 | A1* | 10/2022 | Ruggeri | H02M 1/0095 |

OTHER PUBLICATIONS

Lu et al., Current Programmed Mode Control of Multi-Level Flying Capacitor Converter Near Zero-Ripple Current Region, 2019 IEEE Applied Power Electronics Conference and Exposition (APEC), Mar. 17, 2019, pp. 3064-3070.

* cited by examiner

LOW-POWER MODE FOR MULTI-LEVEL CONVERTER

RELATED APPLICATION

The present disclosure claims priority to U.S. Provisional Patent Application No. 63/440,287, filed Jan. 20, 2023, which is incorporated by reference herein in its entirety.

FIELD OF DISCLOSURE

The present disclosure relates in general to circuits for electronic devices, including without limitation personal audio devices such as wireless telephones and media players, and more specifically, closed-loop control of power converters, including multi-level power converters.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones, one or more speakers, haptic actuators, camera stabilization motors, and/or other load. Such circuitry often includes a driver including a power amplifier for driving an output signal to such loads. Oftentimes, a power converter may be used to provide a supply voltage to a power amplifier in order to amplify a signal driven to speakers, headphones, other transducers, or other loads. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier. A power converter may be used to provide supply voltage rails to one or more components in a device. A power converter may also be used in other applications besides driving audio transducers, such as driving haptic actuators or other electrical or electronic loads. Further, a power converter may also be used in charging a battery from a source of electrical energy (e.g., an AC-to-DC adapter).

To achieve power efficiency at light loads, power converters may be required to limit the magnitude of reverse current, as reverse current causes power loss and back-powers the power supply (e.g., battery). Limiting reverse current may be achieved using demagnetization or synchronous demagnetization with a zero-cross detector, with synchronous demagnetization typically achieving higher power efficiency. To also achieve power efficiency at light loads, power converters may also reduce switching frequency at low loads to reduce non-conduction loss terms.

A type of power converter known as a multi-level power converter (e.g., n-level power converter where n≥3), may have unique challenges at lighter loads. For example, multi-level converters may comprise one or more fly capacitors that need to be regulated within a defined range of voltage for considerations including operation within a safe operating area. However, at light loads, there may be insufficient current available to actively balance the one or more fly capacitors. Further, the magnetization and magnetization slopes may become shallow at multiple duty cycles using the typical continuous conduction mode sequence of the multi-level converter, such as a duty cycle of 0.5 for a 3-level converter (e.g., wherein duty cycle equals a ratio of an output voltage $V_{OUT}$ to an input voltage $V_{IN}$ for a buck mode operation of a 3-level converter). Such shallow slopes may not allow the power inductor of the power converter to demagnetize in time for the next switching pulse.

FIG. 1 illustrates selected components of an example circuit 100 for driving a load 120, as is known in the art. As shown in FIG. 1, a modulator 110 may receive a control parameter REF (e.g., which may be a digital signal indicative of a desired output voltage $V_{OUT}$ to be driven to load 120 or desired current $I_L$ to be driven through a power inductor of the modulator), and based on such control parameter, generate switching control signals for controlling switches of an analog power stage 101, such as a power converter, for example.

One type of power converter often used in electronic circuits is a 3-level power converter. FIG. 1 depicts analog power stage 101 as a 3-level power converter, as is known in the art. As shown in FIG. 1, analog power stage 101 may receive an input voltage $V_{IN}$ and have an output configured to generate an output voltage $V_{OUT}$ based on switching signals received from modulator 110. Further, analog power stage 101 may include a switching node having a voltage $L_X$. Analog power stage 101 may include a power inductor 102 coupled between the switching node and the output. Moreover, analog power stage 101 may include a flying capacitor 104 having a first capacitor terminal and a second capacitor terminal. In addition, analog power stage 101 may include a plurality of switches **106*a*, 106*b*, 106*c*, and 106*d*, wherein switch 106*a* is coupled between the input and the first capacitor terminal, switch 106*b* is coupled between the first capacitor terminal and the switching node, switch 106*c* is coupled between the second capacitor terminal and the switching node, and switch 106*d* is coupled between the second capacitor terminal and a ground voltage. In operation, switches 106*a*, 106*b*, 106*c*, and 106*d* may be controlled by modulator 110** to regulate output voltage $V_{OUT}$ to a desired target voltage.

In operation, switches 106 may be controlled to regulate output voltage $V_{OUT}$ to a desired target voltage. As shown in FIGS. 2A and 2B, buck operation of analog power stage 101 may include cyclic, periodic commutation of switches 106 among a first state (φ1), a second state (φ2), a third state (φ3), and a fourth state (φ4). As shown in FIG. 2A, for duty cycles D of less than 0.5, switches **106*a* and 106*c* may be activated (and switches 106*b* and 106*d* deactivated) during the first state in a VCS configuration, switches 106*c* and 106*d* may be activated (and switches 106*a* and 106*b* may be deactivated) during the second state in a GS configuration, switches 106*b* and 106*d* may be activated (and switches 106*a* and 106*c* may be deactivated) during the third state in a GCS configuration, and switches 106*c* and 106*d* may be activated (and switches 106*a* and 106*b*** may be deactivated) during the fourth state in a GS configuration.

Further, as shown in FIG. 2B, for duty cycles D of greater than 0.5, switches **106*a* and 106*b* may be activated (and switches 106*c* and 106*d* deactivated) during the first state in a VS configuration, switches 106*a* and 106*c* may be activated (and switches 106*b* and 106*d* may be deactivated) during the second state in the VCS configuration, switches 106*a* and 106*b* may be activated (and switches 106*c* and 106*d* may be deactivated) during the third state in the VS configuration, and switches 106*b* and 106*d* may be activated (and switches 106*a* and 106*c*** may be deactivated) during the fourth state in the GCS configuration.

The acronyms VS, VCS, GS, and GCS stand for the path of current in each of the respective configurations, wherein "V" stands for the voltage supply, "C" stands for flying capacitor 104, "S" stands for the switching node, and "G" stands for ground voltage.

Multi-level converters such as those depicted in FIGS. 1, 2A, and 2B may have a dedicated balancing loop (not shown) for flying capacitor 104 that uses a current flowing to load 120 to regulate flying capacitor 104. Under light-load scenarios, this loop may shut off and fail to regulate flying capacitor 104. However, such regulation may be needed in order to ensure predictable waveforms for inductor current $I_L$ through power inductor 102 and to ensure safe operating area.

One solution to such problems may be to operate the multi-level converter in a two-level operation which switches the switching node voltage $L_X$ between supply (e.g., input voltage $V_{IN}$) and ground. For example, such two-level switching may be achieved by periodically switching between the VS configuration and the GS configuration shown in FIGS. 2A and 2B. Such two-level switching at light loads that may eliminate complexities when duty cycle D is near 0.5 and simplify balancing of flying capacitor 104 as no current will flow through flying capacitor 104 in such two-level operation. However, such two-level operation may not be as power efficient as three-level switching.

SUMMARY

In accordance with the teachings of the present disclosure, one or more disadvantages and problems associated with operation of multi-level converters at low load conditions may be reduced or eliminated.

In accordance with embodiments of the present disclosure, a system may include a multi-level power converter comprising a plurality of switches and a power inductor electrically coupled to the plurality of switches, wherein the power inductor is coupled to a switching node of the multi-level power converter, wherein the multi-level power converter is capable of applying three or more switching voltages to the switching node. The system may also include a control circuit for generating control signals that define a sequence of switching of the plurality of switches of the multi-level power converter, the control circuit configured to, during a switching cycle of the multi-level power converter in which the power inductor is magnetized and demagnetized, control switching of the plurality of switches among at least three switch configurations during magnetization and demagnetization of the power inductor such that a voltage on the switching node experiences a different respective magnitude of voltage in each of the at least three switch configurations.

In accordance with these and other embodiments of the present disclosure, a method may be provided for a multi-level power converter comprising a plurality of switches and a power inductor electrically coupled to the plurality of switches, wherein the power inductor is coupled to a switching node of the multi-level power converter, wherein the multi-level power converter is capable of applying three or more switching voltages to the switching node. The method may include generating control signals that define a sequence of switching of the plurality of switches of the multi-level power converter and during a switching cycle of the multi-level power converter in which the power inductor is magnetized and demagnetized, controlling switching of the plurality of switches among at least three switch configurations during magnetization and demagnetization of the power inductor such that a voltage on the switching node experiences a different respective magnitude of voltage in each of the at least three switch configurations.

In accordance with these and other embodiments of the present disclosure, a computer program product comprising a computer usable medium having computer readable code physically embodied therein may be provided. The computer program product may comprise computer readable program code for, in a multi-level power converter comprising a plurality of switches and a power inductor electrically coupled to the plurality of switches, wherein the power inductor is coupled to a switching node of the multi-level power converter, wherein the multi-level power converter is capable of applying three or more switching voltages to the switching node: generating control signals that define a sequence of switching of the plurality of switches of the multi-level power converter; and during a switching cycle of the multi-level power converter in which the power inductor is magnetized and demagnetized, controlling switching of the plurality of switches among at least three switch configurations during magnetization and demagnetization of the power inductor such that a voltage on the switching node experiences a different respective magnitude of voltage in each of the at least three switch configurations.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 3:
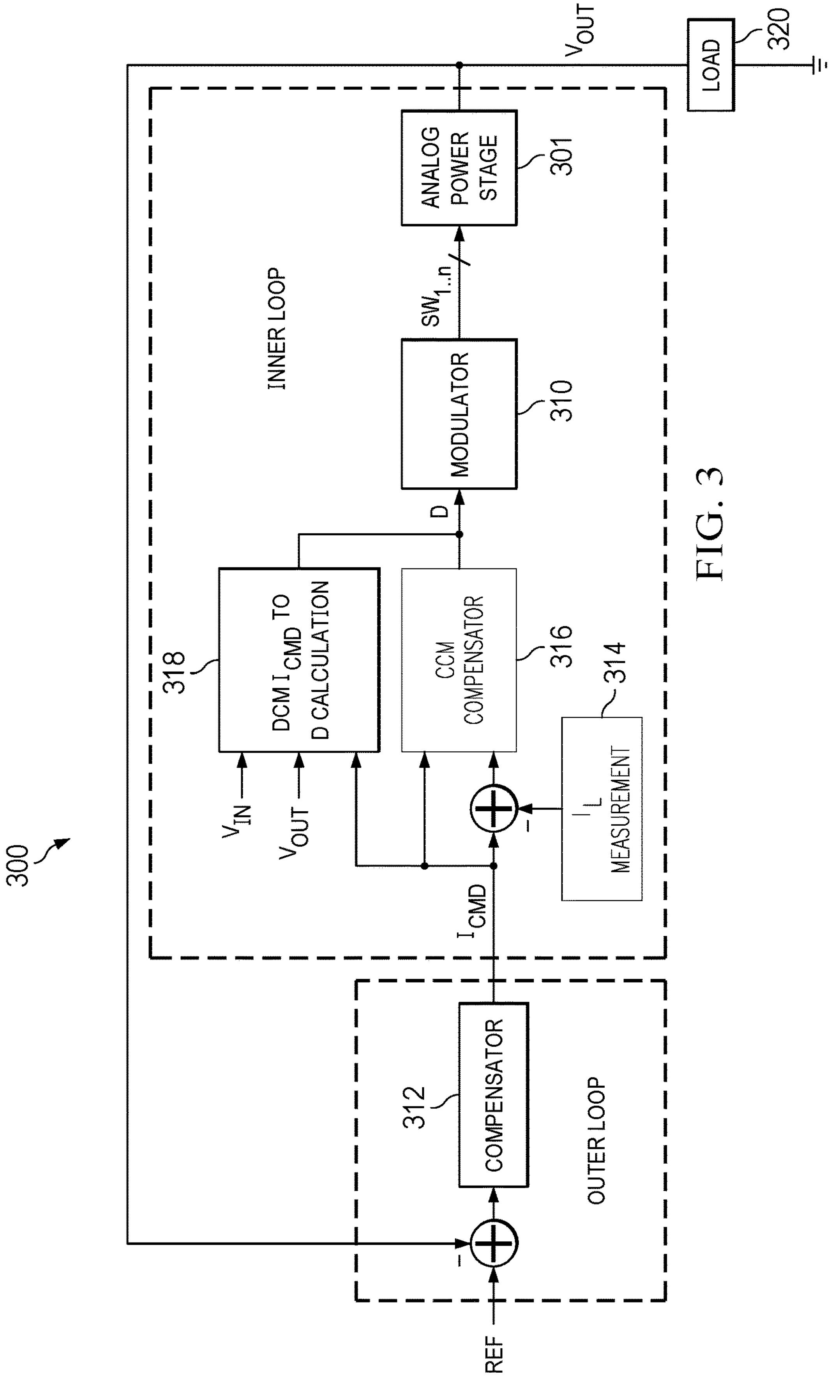
FIG. 3 illustrates a block diagram of selected components of an example system for driving a load using a switched analog power stage, in accordance with embodiments of the present disclosure.

FIG. 3 illustrates a block diagram of selected components of an example system 300 for driving a load 320 using a switched analog power stage 301, in accordance with embodiments of the present disclosure. As shown in FIG. 3, system 300 may include analog power stage 301, modulator 310, compensator 312, inductor current measurement block 314, continuous-conduction mode (CCM) compensation block 316, discontinuous-conduction mode (DCM) current-to-duty-cycle calculation block 318, and load 320.

Analog power stage 301 may comprise any suitable system, device, or apparatus configured to drive a power inductor current $I_L$ and a voltage $V_{OUT}$ from a supply voltage $V_{IN}$ based on switch control signals provided from modulator 310. In some embodiments, analog power stage 301 may comprise an inductive- and/or capacitive-based power converter. In particular embodiments, analog power stage 301 may comprise a multi-level power converter identical or similar to that discussed in the Background section of this application.

Modulator 310 may comprise any suitable system, device, or apparatus configured to receive a duty cycle signal D representative of a target duty cycle for switching of switches of analog power stage 301, and generate switching signals (e.g., $SW_{1 \ldots N}$) for controlling switching of switches integral to analog power stage 301. In some embodiments, modulator 310 may comprise a pulse-width modulator.

Compensator 312 may comprise any suitable system, device, or apparatus configured to receive an error signal equal to the difference between a control parameter REF (e.g., which may be a digital or analog signal indicative of a desired output voltage $V_{OUT}$ to be driven to load 320) and measured output voltage $V_{OUT}$ (or another regulated physical quantity, such as power inductor current $I_L$ or other voltage) and convert such error signal to a commanded current $I_{CMD}$ which may be indicative of a target magnitude (e.g., average current, peak current, etc.) for power inductor current $I_L$ needed to regulate output voltage $V_{OUT}$ in accordance with the error signal.

Inductor current measurement block 314 may comprise any suitable system, device, or apparatus configured to measure current $I_L$. Inductor current measurement block 314 may comprise any suitable combination of analog components (e.g., analog-to-digital converter, comparator, etc.) and/or digital components (e.g., estimator, interpolator, etc.).

In CCM operation of system 300, a CCM compensator 316 may generate duty cycle signal D based on an error signal between commanded current $I_{CMD}$ and measured power inductor current $I_L$. However, in DCM and pulse-frequency modulation (PFM) operation, inductor current measurement block 314 and CCM compensator 316 may be bypassed.

In DCM and PFM operation, which may occur in low-load situations (e.g., current delivered by analog power stage 301 to load 320 below a threshold current level), the control loop of CCM compensator 316 may be disabled and is replaced by feedforward DCM current-to-duty-cycle calculation block 318, which converts commanded current $I_{CMD}$ to duty cycle signal D based on durations of time between pulses of input voltage $V_{IN}$ and output voltage $V_{OUT}$, as described in greater detail below. Any error in calculation of duty cycle signal D may be corrected by the outer control loop of compensator 312. Also, during DCM and PFM operation, integrators of CCM compensator 316 may be held in reset and may be released when operation of system 300 transitions to CCM operation.

To further illustrate operation of DCM current-to-duty-cycle calculation block 318, it is noted that as duty cycle approaches 0.5 in the 3-level power converter disclosed in the Background section, the slope of inductor current $I_L$ as a function of time (e.g., $dI_L/dt$) may become more progressively shallow. Such shallow slope may result in low peak currents, thus reducing the charge delivered in a DCM pulse and thus potentially not allowing for full demagnetization of a power inductor before the subsequent pulse.

Figure 1:
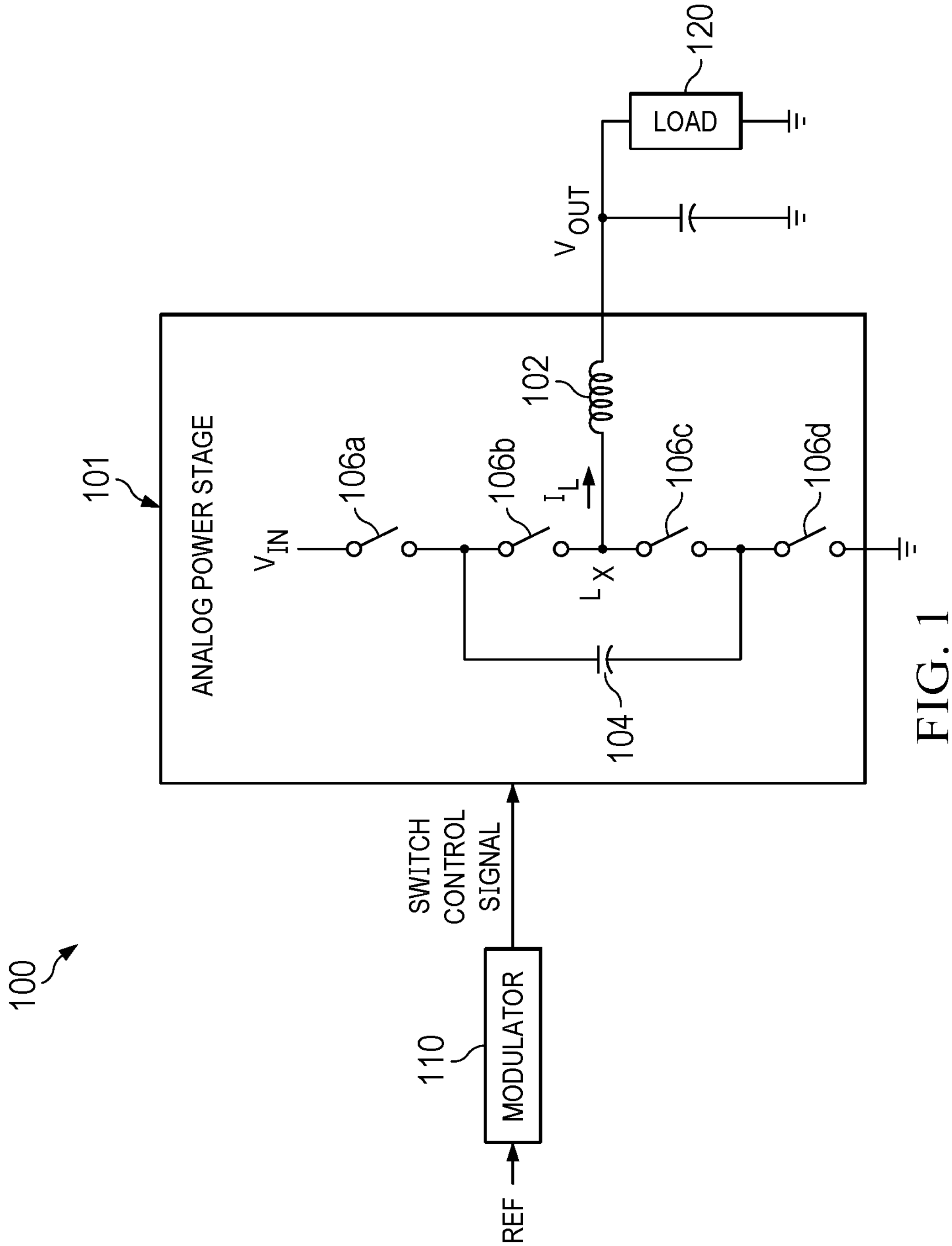
FIG. 1 (PRIOR ART)
FIG. 1 illustrates a circuit diagram of selected components of an example circuit for driving a load using a 3-level power converter, as is known in the art.
Figure 2A:
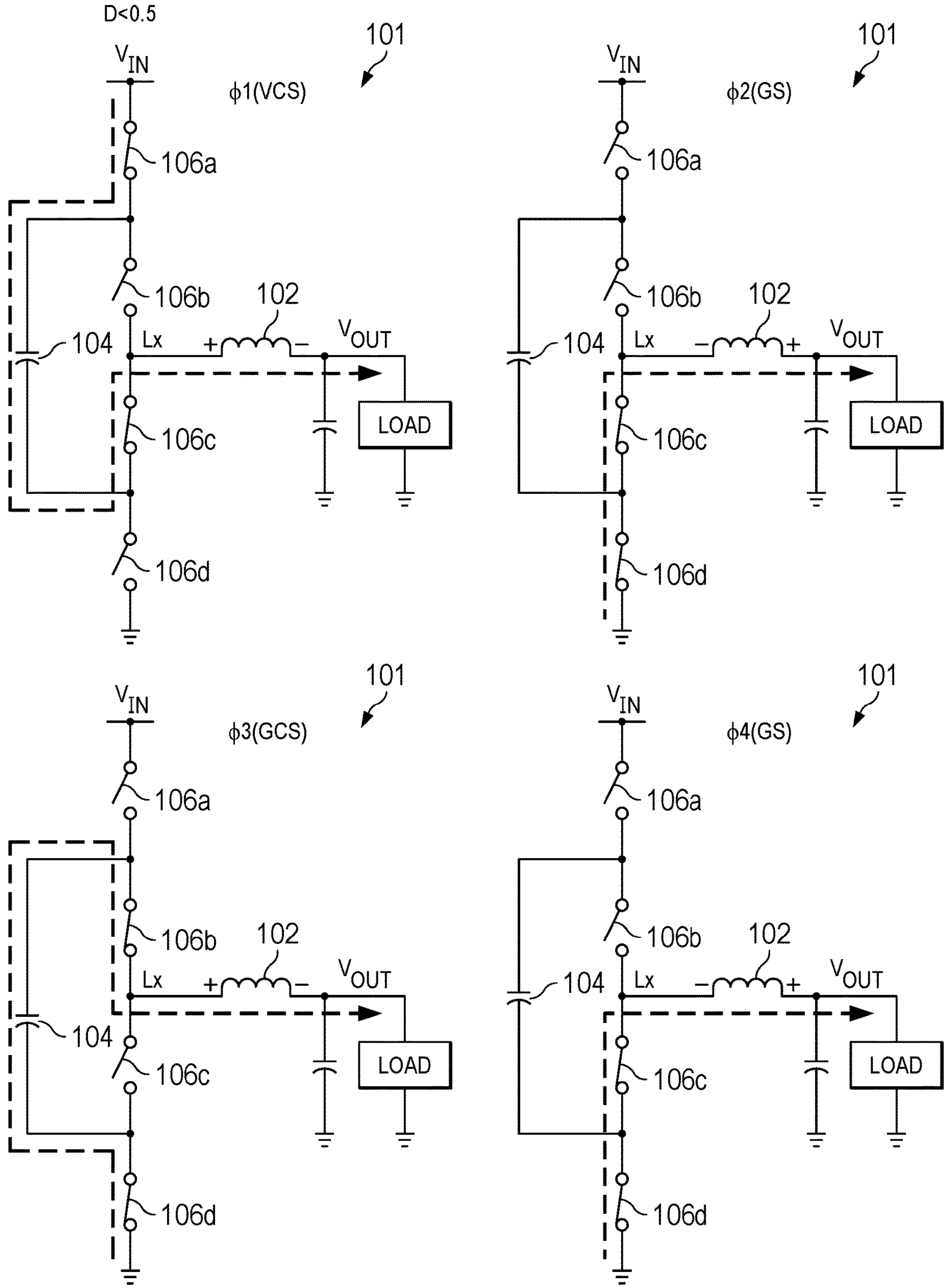
FIG. 2A (PRIOR ART)
FIGS. 2A and 2B illustrate operation of the two-phase 3-level buck converter depicted in FIG. 1, as is known in the art.
Figure 2B:
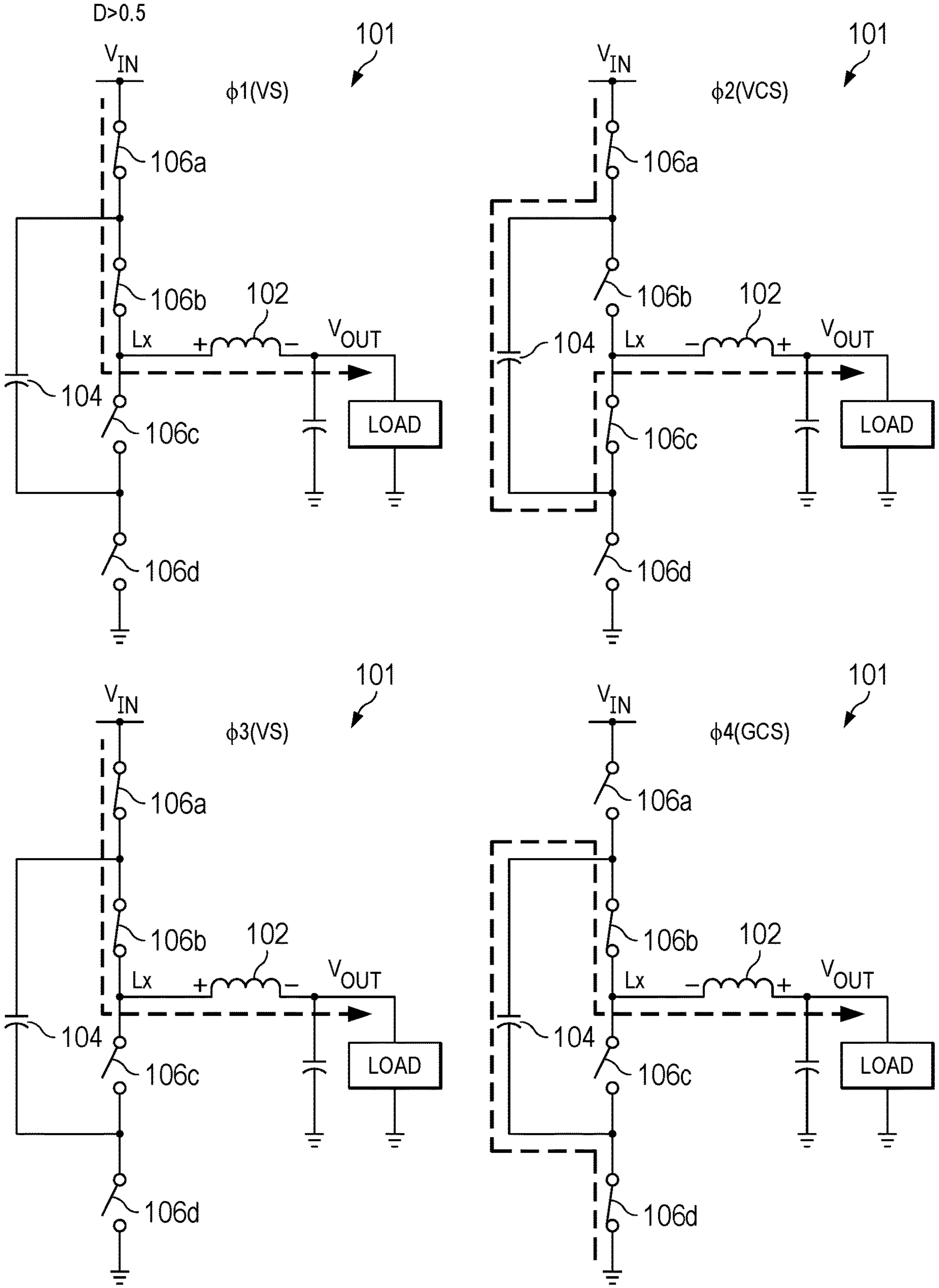
FIG. 2B (PRIOR ART)
Figure 4:
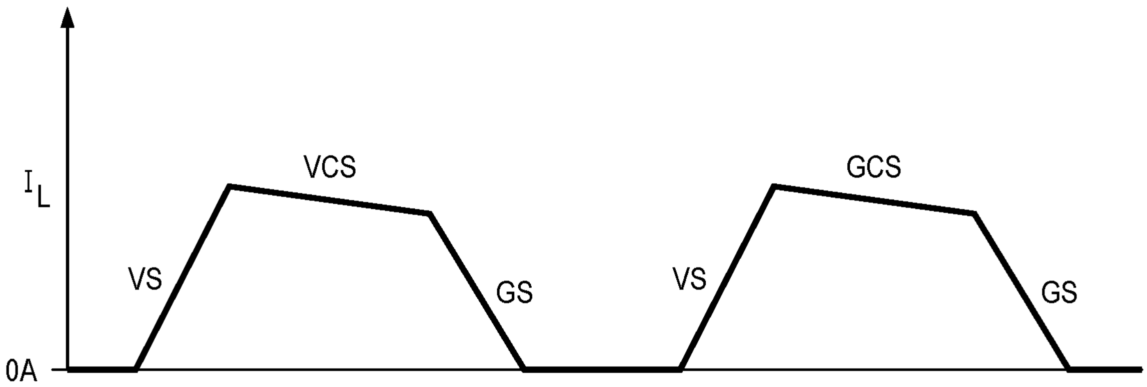
FIG. 4 illustrates an example waveform for an inductor current of the switched analog power stage depicted in FIG. 3, in accordance with embodiments of the present disclosure.

To overcome such disadvantages, during operation in DCM and PFM, DCM current-to-duty-cycle calculation block 318 may employ a modified switching sequence in multi-level operation different from the "normal" switching sequence described in the Background section (e.g., FIGS. 2A and 2B) which may be used during CCM operation. As shown in FIG. 4, under such modified switching sequence, in a magnetizing phase, DCM current-to-duty-cycle calculation block 318 may cause analog power stage 301 to switch to the VS configuration to increase power inductor current $I_L$. In a shallow demagnetizing phase, DCM current-to-duty-cycle calculation block 318 may cause analog power stage 301 to switch to the VCS configuration or the GCS configuration to slowly decrease power inductor current $I_L$. In a non-shallow demagnetizing phase, DCM current-to-duty-cycle calculation block 318 may cause analog power stage 301 to switch to the GS configuration to quickly decrease power inductor current $I_L$ at a rate faster than that of the shallow demagnetizing phase in order to quickly drive power inductor current $I_L$ to zero.

Switching in the modified switching sequence (i.e., in which three or more switching voltages may be applied to the switching node of the power converter during a switching cycle) may be a more power-efficient operation than the two-level operation described in the Background Section. Any height of a current ripple of power inductor current $I_L$ may be adjusted by appropriate weighting of the relative times of the VS configuration, VCS configuration, GCS configuration, and GS configuration. Further, the presence of the VCS and GCS states in the switching sequences may allow for balancing of flying capacitor 104 using the load current, which may not be possible in the two-level operation. Further, in some embodiments, the modified switching sequence may use asynchronous demagnetization during the GS configuration (e.g., via the body diode(s) of either or both of switches 106*c* and 106*d*). Using such asynchronous demagnetization may provide better efficiency than a comparable two-level operation because the VCS configuration and GCS configuration may account for most of the time in which power inductor 102 carries non-zero current.

The foregoing description may apply to operation of system 300 in the buck mode. Operation of system 300 in a boost mode may be analogous to that described above with respect to the buck mode, but wherein magnetization of the power inductor is via the GS configuration and demagnetization of the power inductor is via the VS configuration.

In some embodiments, system 300 may be embodied in a program of computer-readable instructions and executed by a processing device, including without limitation a processor, application-specific integrated circuit, digital signal processor, or any other suitable processing device.

In accordance with the foregoing discussion, a system may include a multi-level power converter comprising a plurality of switches and a power inductor electrically coupled to the plurality of switches, wherein three or more switching voltages may be applied to a power inductor of the power converter, and wherein the power inductor is coupled to a switching node of the multi-level power converter. The system may also include a control circuit for generating control signals that define a sequence of switching of the plurality of switches of the multi-level power converter, the control circuit configured to, during a switching cycle of the multi-level power converter in which the power inductor is magnetized and demagnetized, control switching of the plurality of switches among at least three switch configurations during magnetization and demagnetization of the power inductor such that a voltage on the switching node experiences a different respective magnitude of voltage in each of the at least three switch configurations. As described herein, the control circuit may be configured to control the switching of the plurality of switches among the at least three switch configurations while operating in a discontinuous conduction mode or pulse-frequency modulation mode of operation.

Further, the control circuit may be configured to, while operating in a discontinuous conduction mode or pulse-frequency modulation mode of operation, convert a target current magnitude for current through the power inductor into a duty cycle for switching of the multi-level power converter.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:

a multi-level power converter comprising a plurality of switches and a power inductor electrically coupled to the plurality of switches, wherein the power inductor is coupled to a switching node of the multi-level power converter, wherein the multi-level power converter is capable of applying three or more switching voltages to the switching node; and a control circuit for generating control signals that define a sequence of switching of the plurality of switches of the multi-level power converter, the control circuit configured to:

during a switching cycle of the multi-level power converter in which the power inductor is magnetized and demagnetized, control switching of the plurality of switches among at least three switch configurations during magnetization and demagnetization of the power inductor such that a voltage on the switching node experiences a different respective magnitude of voltage in each of the at least three switch configurations; and while operating in a discontinuous mode or pulse-frequency modulation mode of operation, convert a target magnitude for current through the power inductor into a duty cycle for switching of the multi-level power converter based on durations of time between pulses of an input voltage and output voltage.

2. The system of claim 1, wherein the control circuit is configured to control the switching of the plurality of switches among the at least three switch configurations while operating in a discontinuous conduction mode or pulse-frequency modulation mode of operation.

3. The system of claim 1, wherein the control circuit is configured to control the switching of the plurality of switches among the at least three switch configurations while operating in a continuous conduction mode of operation.

4. The system of claim 1, wherein the control circuit is configured to control switching of the plurality of switches among at least two switch configurations during demagnetization of the power inductor such that a voltage on the switching node experiences a different respective magnitude of voltage in each of the at least two switch configurations, and a change in current with respect to time through the power inductor in each of the at least two switch configurations is different.

5. A method comprising, in a multi-level power converter comprising a plurality of switches and a power inductor electrically coupled to the plurality of switches, wherein the power inductor is coupled to a switching node of the multi-level power converter, wherein the multi-level power converter is capable of applying three or more switching voltages to the switching node:

generating control signals that define a sequence of switching of the plurality of switches of the multi-level power converter;

during a switching cycle of the multi-level power converter in which the power inductor is magnetized and demagnetized, controlling switching of the plurality of switches among at least three switch configurations during magnetization and demagnetization of the power inductor such that a voltage on the switching node experiences a different respective magnitude of voltage in each of the at least three switch configurations; and while operating in a discontinuous mode or pulse-frequency modulation mode of operation, converting a target magnitude for current through the power inductor into a duty cycle for switching of the multi-level power converter based on durations of time between pulses of an input voltage and output voltage.

6. The method of claim 5, further comprising controlling the switching of the plurality of switches among the at least three switch configurations while operating in a discontinuous conduction mode or pulse-frequency modulation mode of operation.

7. The method of claim 5, further comprising controlling the switching of the plurality of switches among the at least three switch configurations while operating in a continuous conduction mode of operation.

8. The method of claim 5, further comprising controlling switching of the plurality of switches among at least two switch configurations during demagnetization of the power inductor such that a voltage on the switching node experiences a different respective magnitude of voltage in each of the at least two switch configurations, and a change in current with respect to time through the power inductor in each of the at least two switch configurations is different.

9. An article of manufacture comprising:

a non-transitory computer readable medium; and computer-executable instructions carried on the computer readable medium, the instructions readable by a processor, the instructions for, in a multi-level power converter comprising a plurality of switches and a power inductor electrically coupled to the plurality of switches, wherein the power inductor is coupled to a switching node of the multi-level power converter, wherein the multi-level power converter is capable of applying three or more switching voltages to the switching node:

generating control signals that define a sequence of switching of the plurality of switches of the multi-level power converter;

during a switching cycle of the multi-level power converter in which the power inductor is magnetized and demagnetized, controlling switching of the plurality of switches among at least three switch configurations during magnetization and demagnetization of the power inductor such that a voltage on the switching node experiences a different respective magnitude of voltage in each of the at least three switch configurations; and while operating in a discontinuous conduction mode or pulse-frequency modulation mode of operation, converting a target magnitude for current through the power inductor into a duty cycle for switching of the multi-level power converter based on durations of time between pulses of an input voltage and output voltage.

10. The article of manufacture of claim 9, further comprising instructions for controlling the switching of the plurality of switches among the at least three switch configurations while operating in a discontinuous conduction mode or pulse-frequency modulation mode of operation.

11. The article of manufacture of claim 9, further comprising instructions for controlling the switching of the plurality of switches among the at least three switch configurations while operating in a continuous conduction mode of operation.

12. The article of manufacture of claim 9, further comprising instructions for controlling switching of the plurality of switches among at least two switch configurations during demagnetization of the power inductor such that a voltage on the switching node experiences a different respective magnitude of voltage in each of the at least two switch configurations, and a change in current with respect to time through the power inductor in each of the at least two switch configurations is different.

* * * * *